United States Patent [19]

Eppenbach

[11] 4,201,320

[45] May 6, 1980

[54] MEASURING DISPENSER

[76] Inventor: Lawrence C. Eppenbach, 419 Kennedy St., Juneau, Ak. 99801

[21] Appl. No.: 936,722

[22] Filed: Aug. 25, 1978

[51] Int. Cl.² ............................................. G01F 11/26
[52] U.S. Cl. .................................................. 222/456
[58] Field of Search ................. 222/454, 456, 457, 49, 222/50

[56] References Cited

U.S. PATENT DOCUMENTS 3,353,725  11/1967  Caceres ................................ 222/456

Primary Examiner—Allen N. Knowles
Attorney, Agent, or Firm—Gordon L. Peterson

[57] ABSTRACT

A measuring dispenser for divided material comprising a container having an open top and a closure for the open top of the container. The closure includes an end wall having an opening therein, a peripheral wall joined to the end wall, and a first baffle projecting inwardly from the peripheral wall. A receiving chamber having an inlet communicates with the interior of the container. A slide is mounted on the end wall for movement in the receiving chamber to open and close the opening and to vary the volume of the region of the receiving chamber which can receive divided material from the inlet. The opening in the end wall defines an outlet for the receiving chamber.

13 Claims, 7 Drawing Figures

U.S. Patent  May 6, 1980  4,201,320
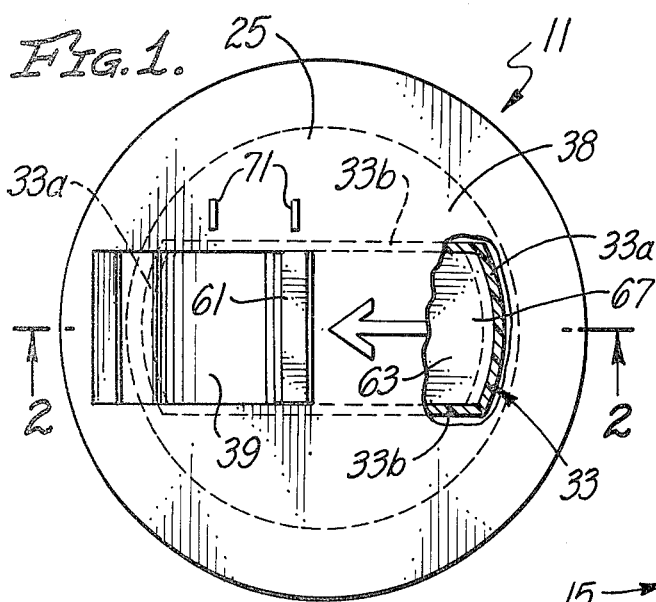
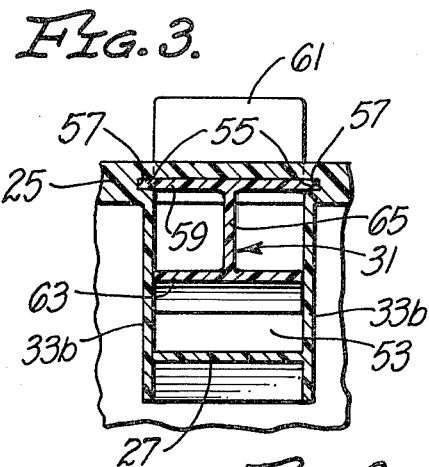
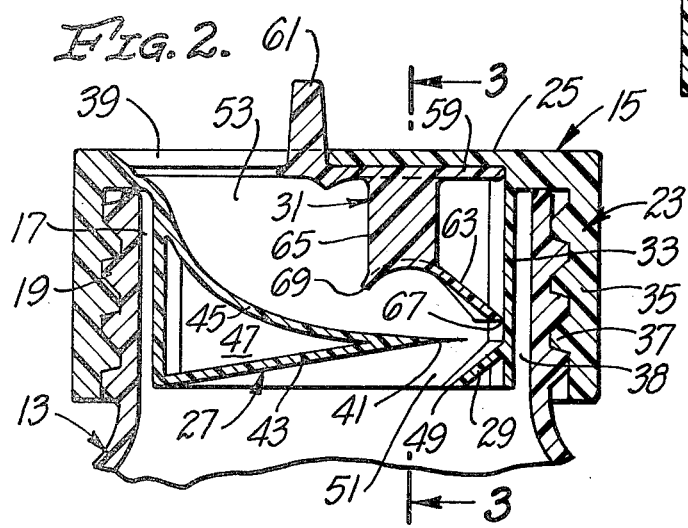
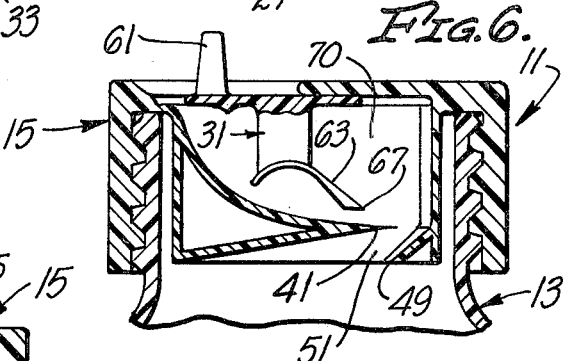
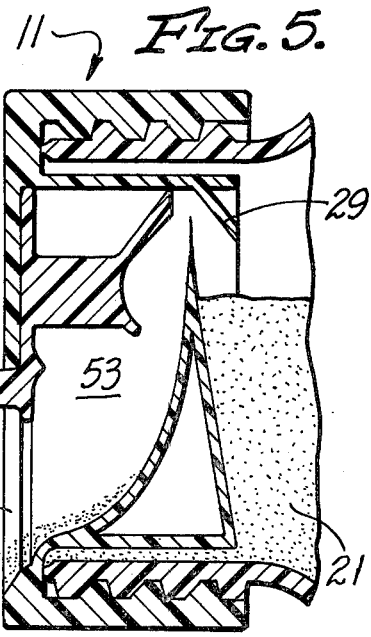
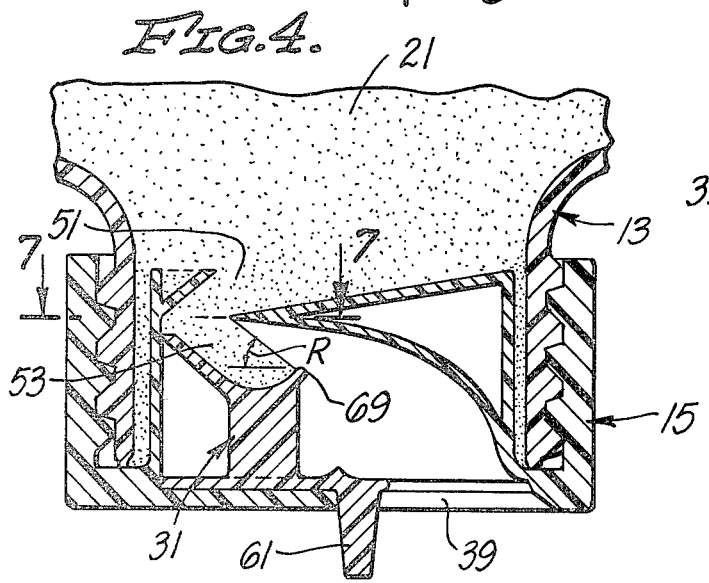
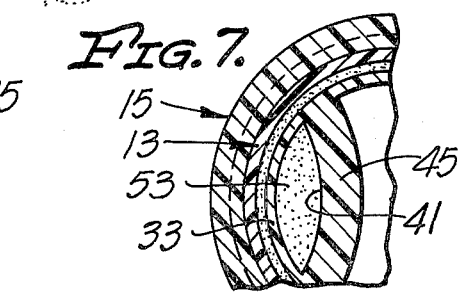

MEASURING DISPENSER

BACKGROUND OF THE INVENTION

A measuring dispenser is an apparatus which permits measured quantities of a material, such as divided material which is typically dry, to be poured from a container. The measuring dispenser may be considered to include the container and the measuring apparatus or just the measuring apparatus. Measuring dispensers may be used for dispensing various kinds of divided materials, such as flakes, powders or granules. For example, edible granular material, such as salt, sugar, coffee, spices, etc. may be dispensed.

Measuring dispensers are commonly operated by moving the dispenser to a first orientation to load a receiving chamber with divided material. Thereafter, the measuring dispenser is turned to a second orientation so that the divided material previously loaded into the receiving chamber can be dispensed by gravity through the outlet of the dispenser.

One class of measuring dispenser of this kind dispenses a fixed volume of material in each dispensing operation. Constructions of this type are shown, by way of example, in Souza U.S. Pat. No. 3,221,951 and Daniels U.S. Pat. No. 3,680,744. These devices possess the disadvantage of being incapable of measuring different quantities of the divided material.

Various kinds of measuring dispensers which can dispense variable volumes of divided material are known. These measuring dispensers may employ a piston for varying the volume of the receiving chamber as shown, by way of example, in U.S. Pat. No. 2,800,257 issued to Nixon, multiple pockets or receiving chambers as shown, by way of example, in U.S. Pat. Nos. 2,799,436 and 3,414,172 issued to Bernhardt and Souza, respectively, or an extendible chute device as shown in U.S. Pat. No. 3,484,025 issued to Capalia. In addition, Katzmark U.S. Pat. No. 3,836,055 provides for varying the volume of a receiving chamber by a movable plate.

All of these prior art devices have various disadvantages. For example, many of these devices are unsuited for small containers and some require intricately shaped components. In others, the measuring apparatus wastes a considerable amount of space.

SUMMARY OF THE INVENTION

The present invention provides a measuring dispenser of simple and inexpensive construction which is adaptable for use with large or small containers. The portion of the apparatus which performs the measuring function requires only a minimum amount of space.

The measuring dispenser of this invention provides a receiving chamber which can be of substantially fixed volume. The receiving chamber has an inlet so that in at least one orientation, i.e., a loading orientation, of the measuring dispenser, the divided material can flow through the inlet into a region of the receiving chamber.

To obtain the desired metered quantity of the divided material, a displacement slide is utilized. The slide is mounted for movement along a path in the receiving chamber, but this movement does not substantially vary the volume of the receiving chamber. The slide moves along the path so that it can block at least part of the region of the receiving chamber into which the divided material is to flow from the inlet. The portion of such region blocked by the slide is a function of the position of the slide along the path so that the volume of the region available to receive the divided material can in this way be varied, either in steps or infinitely. The receiving chamber has an outlet through which the divided material can flow when the measuring dispenser is moved to a second orientation, i.e., a dispensing orientation.

The measuring dispenser may include a container for the divided material or it may consist essentially of the closure for the container. Thus, the receiving chamber can be defined by the closure and/or the container.

In a preferred embodiment, the receiving chamber defining means includes an end wall having an opening therein, a first baffle and means for coupling the first baffle to the end wall with the first baffle being spaced over at least some of its length from the end wall. The baffle has a concavely curved baffle edge which convexly curves one wall of the divided material in the receiving chamber to inhibit movement of such material if the container is tilted or rolled. Although the displacement slide can be mounted in different ways, it is preferred to mount the slide on the end wall for movement to open and close the opening and to vary the volume of the region of the receiving chamber which can receive the divided material from the inlet. In a preferred construction, movement of the slide to increase the volume of the region which can receive divided material reduces the area of the opening.

To provide greater control of the quantity of material dispensed, a second baffle can be utilized adjacent the first baffle. In this event, the baffles are preferably spaced apart to at least partially define the inlet to the receiving chamber. The slide preferably has a projection extending toward the first baffle which tends to confine the divided material in the loading orientation of the measuring dispenser.

The invention, together with further features and advantages thereof, may best be understood by reference to the following description taken in connection with the accompanying illustrative drawing.

BRIEF DESCRIPTION OF THE DRAWING

FIG. 1 is a top plan view of a measuring dispenser constructed in accordance with the teachings of this invention with portions of the end wall and slide broken away.

FIG. 2 is an enlarged, fragmentary sectional view taken generally along line 2—2 of FIG. 1.

FIG. 3 is a fragmentary sectional view taken generally along line 3—3 of FIG. 2.

FIG. 4 is a fragmentary sectional view showing the measuring dispenser in the loading orientation.

FIG. 5 is a view similar to FIG. 3 showing the measuring dispenser in the dispensing position.

FIG. 6 is a view similar to FIG. 2 with the slide moved to permit the dispensing of a larger volume of divided material.

FIG. 7 is a fragmentary sectional view taken along line 7—7 of FIG. 4.

DESCRIPTION OF THE PREFERRED EMBODIMENT

FIGS. 1-3 show a measuring dispenser 11 which generally comprises a container 13 and a container closure 15 which also serves as the measuring apparatus for the measuring dispenser. Although the container 13 may take different forms, in the embodiment illustrated, it is in the form of a bottle having an open top 17 and external screw threads 19 adjacent the open top. The container 13 is adapted to contain divided material 21 (FIGS. 4 and 5) which it is desired to dispense in varying quantities.

Although the closure 15 can be formed integrally with the container 13, in the embodiment illustrated, it is removably attached to the upper end of the container. Thus, the closure 15 can be removed to permit the container 13 to be refilled or it can be removed from the container 13 and applied to another container.

The closure 15 includes a peripheral wall 23, a circular end wall 25, a first relatively large baffle 27, a smaller baffle 29 and a displacement slide 31. Although the peripheral wall 23 can be constructed in different ways, in the embodiment illustrated, it includes tubular interior peripheral wall 33 which is receivable within the upper end of the container 13 through the open top 17 and an annular exterior peripheral wall 35. As shown in FIG. 1, the interior peripheral wall 33 has arcuate end sections 33a and planar side sections 33b. The exterior peripheral wall 35 has internal screw threads 37 which cooperate with the threads 19 to permit the closure 15 to be selectively attached to, and removed from, the upper end of the container 13. With the closure 15 attached to the container 13, the interior peripheral wall 33 and the exterior peripheral wall 35 receive the upper end of the container 13 therebetween as shown in FIG. 2 with a gap 38 separating the interior peripheral wall 33 from the container.

The end wall 25 closes the open top 17 of the container 13 and has an opening or outlet 39 therein. Although the outlet 39 can be of different configurations, the illustrated form of the invention, the outlet 39 is elongated and extends radially on the circular end wall 25.

The baffle 27 can advantageously be formed integrally with the interior peripheral wall 33. The baffle 27 extends completely between, and is integral with, the side sections 33b (FIG. 3), and terminates in a curved, concave, relatively sharp baffle edge 41 which is spaced from the adjacent region of the end section 33a of the interior peripheral wall 33. In the embodiment illustrated, the baffle 27 is formed by a generally flat planar lower wall 43 and a curved upper wall 45. The lower wall 43 is inclined upwardly as it extends toward the baffle edge 41. The upper wall 45 is concave upwardly and cooperates with the lower wall 43 and the interior peripheral wall 33 to define a void 47.

Although the baffle 29 can be of different configurations and can be oriented in different ways, in the embodiment illustrated, it is in the form of a planar segment or plate which is integral with one of the end sections 33a at a location which is generally directly opposite, and substantially in the same radial plane as, the baffle edge 41. The baffle 29 is integral with and extends completely between the side sections 33b and also extends downwardly as it extends toward the baffle edge 41. The baffle 29 terminates in a baffle edge 49 to define an opening or inlet 51. In the embodiment illustrated, the baffle edge 49 is located directly axially below the baffle edge 41, and the two baffle edges are of substantially the same length.

The baffle 27, the interior peripheral wall 33 and the end wall 25 define a receiving chamber 53 with the inlet 51 leading to the receiving chamber and the outlet 39 leading from the receiving chamber. The displacement slide 31 is mounted for movement in the receiving chamber 53. The peripheral wall 23, the end wall 25 and the baffles 27 and 29 can advantageously be integrally molded from a suitable rigid plastic material.

Although the slide 31 can be mounted in different ways, in the embodiment illustrated, it includes longitudinal flanges 55 (FIG. 3) slidably received within opposed grooves 57 extending along the opposite longitudinal edges of the outlet 39 in the end wall 25. Thus, the slide 31 can be moved to vary the area of the outlet 39.

The slide 31 also includes an upper plate section 59 with the flanges 55 defining the opposite longitudinal ends of the plate section, and adjustment tab 61 integral with the plate section and extending through the outlet 39 perpendicular to the plate section, a curved interior wall 63 and a web 65 for integrally joining the wall 63 to the plate section 59. The slide 31 can advantageously be integrally molded from a suitable rigid plastic material.

The entire slide 31, except for the tab 61, lies within the receiving chamber 53. The wall 63 is concave downwardly as viewed in FIG. 2, i.e., toward the inlet 51. The interior wall 63 has an edge 67 which engages the end section 33a of the interior peripheral wall 33 immediately above the baffle 29 when the slide 31 is in the extreme righthand position as viewed in FIG. 2. The edge 67 is curved in the same manner as the end section 33a and extends for the full length thereof so that the edge 67 can contact the end section 33a for the full length of the end section (FIG. 1). The opposite end portion of the interior wall 63 curves sharply toward the baffle 27 and defines, in effect, a projection 69 which extends toward the baffle 27.

In use, the measuring dispenser 11 is turned through 180 degrees from the position shown in FIG. 2 to the position shown in FIG. 4, thereby allowing the divided material 21 to flow by gravity through the inlet 51 into the receiving chamber 53. Divided material has a known substantially constant angle of repose R (FIG. 4). Accordingly, only a region of the receiving chamber 53 adjacent the inlet 51 is able to receive divided material when the measuring dispenser 11 is in the loading position of FIG. 3. The projection 69 confines the divided material when the measuring dispenser 11 is in the loading position and provides a sharp cut-off point from the divided material. Thereafter, the measuring dispenser 11 can be rotated through 90 degrees to the position of FIG. 5 to allow the divided material 21 to pass from the receiving chamber 53 through the outlet 39. The upper wall 45 curves toward the outlet 39 to guide divided material out through the outlet.

As shown in FIGS. 1-5, the slide 31 is set to measure the smallest quantity which the measuring dispenser 11 is capable of dispensing in metered quantities. To increase the quantity of divided material which is to be dispensed, the user moves the slide 31 to, for example, the position shown in FIG. 6 by pushing on the tab 61. This does not alter the volume of the receiving chamber 53. However, movement of the slide 31 in this manner moves the edge 67 away from the end section 33a of the interior peripheral wall 33 to enlarge the region of the receiving chamber 53 into which the divided material 21 may flow in the loading position of FIG. 3. Specifically, the region 70 of the receiving chamber 53 can now receive the divided material 21. Movement of the slide 31 to the left also causes the plate section 59 to reduce the area of the outlet 39. Accordingly, upon movement of the measuring dispenser 11 to the loading orientation of FIG. 3, a greater quantity of divided material will flow from the container 13 into the receiving chamber 53.

The outer surface of the end wall 25 preferably has indicia 71 which indicate the volume which will be dispensed with the tab 61 centered on any one of such indicia. Although the baffle 29 can be eliminated, it provides for more accurate dispensing by preventing divided material within the container 13 from passing through the inlet 51 when the measuring dispenser 11 is in the dispensing position of FIG. 5.

It should be noted that the web 65 is relatively thin as viewed in FIG. 3 and that it does not extend completely between the wall sections 33b. Accordingly, divided material in the region 70 of the receiving chamber can readily flow to the outlet 39 by passing around the web 65.

In the specific embodiment illustrated, the slide 31 is adapted for stepwise actuation to vary in discrete steps the amount of divided material which is dispensed. For example, with the slide 31 in the position of FIG. 2, ⅛ teaspoon can be dispensed and, with the slide in the position of FIG. 6, ½ teaspoon can be dispensed. Thus, the indicia 71 in this event would represent ⅛ and ½-teaspoon volumes, respectively. Of course, different volumes may be dispensed depending upon the size of the receiving chamber 53. Suitable detents or click stops (not shown) can be used to releasably retain the slide 31 in the two positions illustrated by the indicia 71, as well as in a fully closed position in which the plate section 59 completely closes the outlet 39. Thus, the slide 31 can be moved from the small volume position of FIG. 2 through the large volume position of FIG. 6 to the fully closed position. Of course, the slide 31 could be configured so that the volumes which are dispensed can be infinitely variable.

With reference to FIG. 7, it can be seen that the baffle edge 61 is concavely curved and that the corresponding wall of the divided material 21 in the receiving chamber 53 is correspondingly convexly curved. This is desirable because it reduces the likelihood that any of the divided material in the receiving chamber 53 can pass through the outlet 39 if there is any slight rolling movement of the container 13 about its axis.

Although the closure 15 and the container 13, in the embodiment illustrated, are circular as viewed in plan, obviously these elements can be of noncircular configuration, such as rectangular. The closure 15 can be advantageously molded of plastic material in several different sections of convenient sizes and configurations for plastic molding purposes, and thereafter these sections can be suitably joined together.

Although an exemplary embodiment of the invention has been shown and described, many changes, modifications and substitutions may be made by one having ordinary skill in the art without necessarily departing from the spirit and scope of this invention.

I claim:

1. A measuring dispenser for divided material comprising:
   first means for defining a receiving chamber of substantially fixed volume, said receiving chamber having an inlet whereby in at least one orientation of the measuring dispenser the divided material can flow through the inlet into a region of the receiving chamber;
   a displacement slide;
   means for mounting the displacement slide on the first means for movement along a path in the receiving chamber without varying the volume of the receiving chamber, said displacement slide being movable along said path so that the displacement slide can block at least a portion of said region from said inlet in at least one position of said displacement slide and can open at least a part of said portion of said region to said inlet in a second position of said displacement slide whereby the volume of said region available to receive the divided material from the inlet in said one orientation can be varied;
   said receiving chamber having an outlet through which the divided material at said region can flow when the measuring dispenser is moved to a second orientation; and
   said first means including an end wall having said outlet therein, said mounting means mounts the displacement slide to progressively open and close the outlet as the displacement slide is moved along said path.

2. A measuring dispenser as defined in claim 1 including first and second baffles spaced apart to at least partly define said inlet.

3. A measuring dispenser for divided material comprising:
   first means for defining a receiving chamber;
   said first means including an end wall having an opening therein, a first baffle and means for coupling the first baffle to the end wall with the first baffle being spaced over at least some of its length from the end wall;
   said receiving chamber having an inlet whereby in at least one orientation of the measuring dispenser the divided material can flow through the inlet into a region of the receiving chamber;
   a displacement slide;
   means for mounting the displacement slide on the end wall for movement in the receiving chamber to open and close said opening and to vary the volume of the region of the receiving chamber which can receive divided material from the inlet in said one orientation; and
   said opening in said end wall communicating with said receiving chamber and defining an outlet for the receiving chamber.

4. A measuring dispenser as defined in claim 3 wherein said coupling means includes a peripheral wall and said first baffle projects inwardly from said peripheral wall.

5. A measuring dispenser as defined in claim 4 wherein said first baffle terminates at a first baffle edge, said measuring dispenser includes a second baffle extending from the peripheral wall inwardly and terminating at a second baffle edge, said baffle edges being spaced apart and at least partially defining said inlet.

6. A measuring dispenser as defined in claim 3 wherein said mounting means mounts the displacement slide for movement such that the region of the receiving chamber which is available to receive the divided material in said one orientation is increased as the displacement slide is moved to reduce the area of said opening.

7. A measuring dispenser as defined in claim 3 wherein the displacement slide has a projection extending toward the first baffle to tend to confine the divided material in said one orientation of the measuring dispenser.

8. A measuring dispenser as defined in claim 3 including a container for the divided material coupled to said first means, said container having an open top which is closed by said end wall.

9. A measuring dispenser as defined in claim 8 wherein said coupling means includes a peripheral wall, said first baffle projects inwardly from the peripheral wall and terminates at a first baffle edge, said measuring dispenser includes a second baffle extending from the peripheral wall inwardly and terminating at a second baffle edge, said baffle edges being spaced apart and at least partially defining said inlet, and said mounting means mounts the displacement slide for movement such that the region of the receiving chamber which can receive divided material in said one orientation is increased as the displacement slide is moved to reduce the area of said opening.

10. A measuring dispenser as defined in claim 3 wherein said first baffle terminates a baffle edge which at least partly defines said inlet, said baffle edge being generally concave in a direction to tend to provide the divided material in said region of said receiving chamber with a generally convex side.

11. A measuring dispenser for divided material comprising:
    first means for defining a receiving chamber of substantially fixed volume, said receiving chamber having an inlet whereby in at least one orientation of the measuring dispenser the divided material can flow through the inlet into a region of the receiving chamber;
    a displacement slide;
    means for mounting the displacement slide on the first means for movement along a path in the receiving chamber without varying the volume of the receiving chamber, said displacement slide being movable along said path so that the displacement slide can block at least a portion of said region from said inlet in at least one position of said displacement slide and can open at least a part of said portion of said region to said inlet in a second position of said displacement slide whereby the volume of said region available to receive the divided material from the inlet in said one orientation can be varied;
    said receiving chamber having an outlet through which the divided material at said region can flow when the measuring dispenser is moved to a second orientation; and
    a container for the divided material coupled to said first means, said container having an open top, said first means including an end wall for closing said open top of the container.

12. A measuring dispenser for divided material comprising:
    first means for defining a receiving chamber of substantially fixed volume, said receiving chamber having an inlet whereby in at least one orientation of the measuring dispenser the divided material can flow through the inlet into a region of the receiving chamber;
    a displacement slide;
    means for mounting the displacement slide on the first means for movement along a path in the receiving chamber without varying the volume of the receiving chamber, said displacement slide being movable along said path so that the displacement slide can block at least a portion of said region from said inlet in at least one position of said displacement slide and can open at least a part of said portion of said region to said inlet in a second position of said displacement slide whereby the volume of said region available to receive the divided material from the inlet in said one orientation can be varied;
    said receiving chamber having an outlet through which the divided material at said region can flow when the measuring dispenser is moved to a second orientation; and
    said first means including a peripheral wall, means adjacent one end of the peripheral wall defining said inlet, and an end wall adjacent the other end of said peripheral wall for at least partially closing said other end of the peripheral wall, said mounting means mounts said slide on said end wall.

13. A measuring dispenser as defined in claim 12 wherein said slide includes a first wall for blocking said portion of said region of said receiving chamber from said inlet in said one position of said displacement slide and passage means between the end wall and said first wall for permitting the divided material in said part of said region of said receiving chamber to pass to said outlet in said second orientation.

* * * * *